Figure 1:
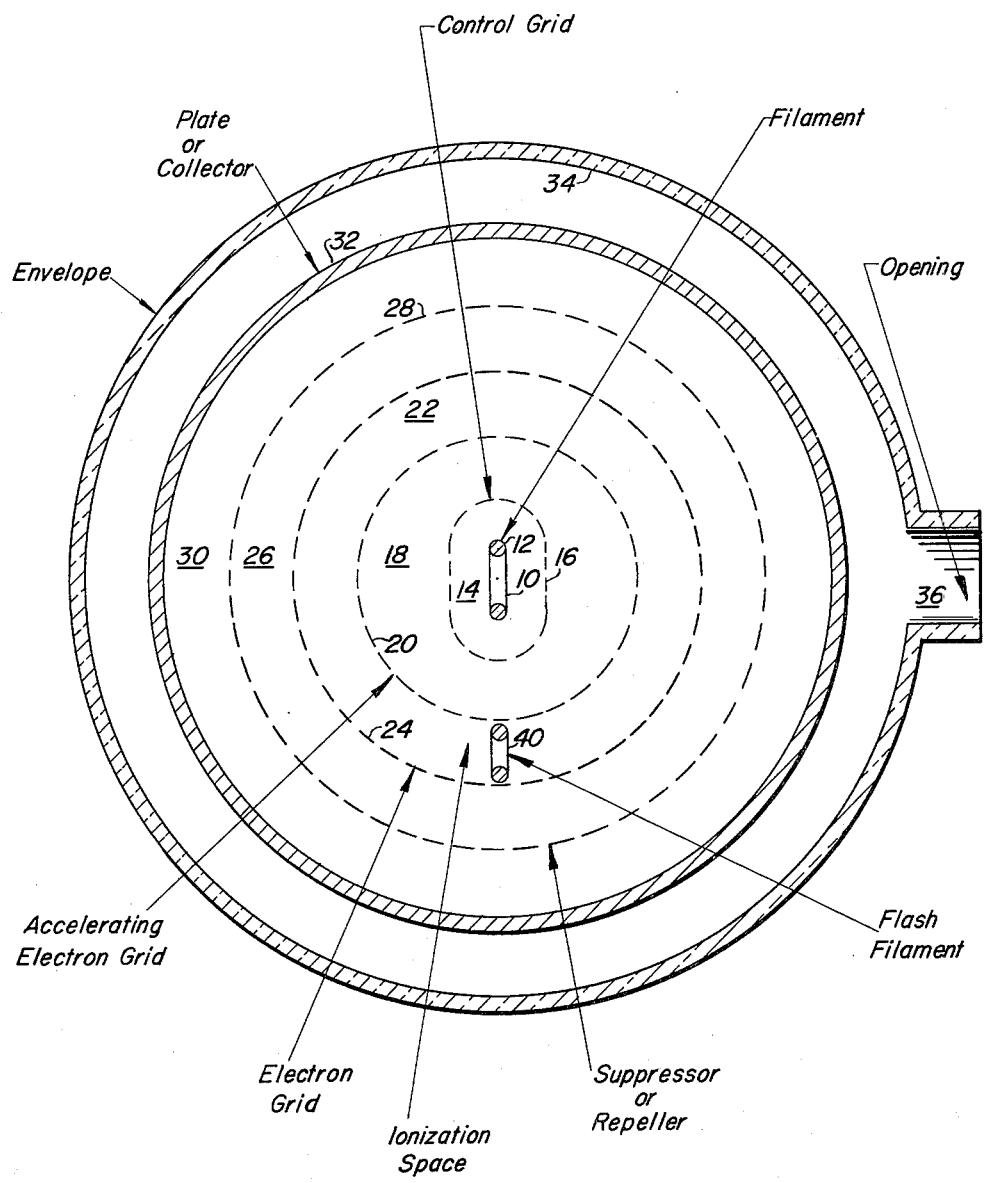

INVENTOR.
Wayne B. Nottingham
BY
Oliver W. Hoyes

Sept. 19, 1961     W. B. NOTTINGHAM     3,001,128

MEASURING

Filed Aug. 27, 1958     2 Sheets-Sheet 2

INVENTOR.
Wayne B. Nottingham
BY
Oliver W. Hoages 3,001,128
MEASURING
Wayne B. Nottingham, Cambridge, Mass., assignor to National Research Corporation, Cambridge, Mass., a corporation of Massachusetts
Filed Aug. 27, 1958, Ser. No. 757,583
6 Claims. (Cl. 324—33)

The invention relates to a vacuum gauge and, more particularly, to an ionization vacuum gauge. The principal object of the present invention is to provide a hot-filament type of ionization gauge for the measurement of very low pressures and to incorporate a number of advantageous features not previously utilized for ionization gauge purposes.

The operation of an ionization gauge depends on the emission of electrons from a heated source and their acceleration into an ionization region where gas molecules may be ionized. These ions are collected and the ratio of the ion current to the electron current is taken as a direct measure of pressure. Other phenomena occur that interfere with the direct determination of ion production and its accurate measurement at the ion collector. The most important of these interferences comes from the fact that electrons produce soft X-rays when they are absorbed by the electron collector. These X-rays in turn are absorbed at the surface of the ion collector and yield photo-electric emission. The level of this photo-electric emission, which is independent of pressure, is determined by (1) the total electron current; (2) the production efficiency of X-rays and photoelectrons; and (3) the surface area of the ion collector that receives these soft X-rays.

R. T. Bayard has been granted U.S. Patent 2,605,431 on an ionization gauge in which a distinct improvement was made in the reduction of this background current by reducing the area of the ion collector by a factor of approximately 200 without interfering with either the efficiency of the production of the ions or their collection. His invention reduced the pressure equivalent of this background from approximately $2 \times 10^{-8}$ mm. to $10^{-10}$ mm. One of the advantages of the present improvement is the extension in the range of reliably measurable pressures to still lower values than those obtained previously with hot-filament ionization gauges.

Some of the most important improvements contributed by our new gauge are reviewed here.

(1) The pressure range which is practical in one of these gauges is $10^{-2}$ mm. at the high pressure end and less than $10^{-12}$ mm. at the low pressure limit.

(2) The fact that the electron emission under normal operating conditions will be space charge limited makes the electron current practically independent of most changes in the work-function of the emitter. In other hot filament gauges, the control of the electron current is by means of the temperature variation of the emitter and with that type of control the emission current is very sensitive to both work-function and temperature changes. Electron current stability is very important if production processes are being monitored by an ionization gauge.

(3) Since the electron current is controlled by the voltage on the first grid, this new gauge lends itself to precise electronic control of the electron current. Many advantages accrue from this feature.

Figure 2:
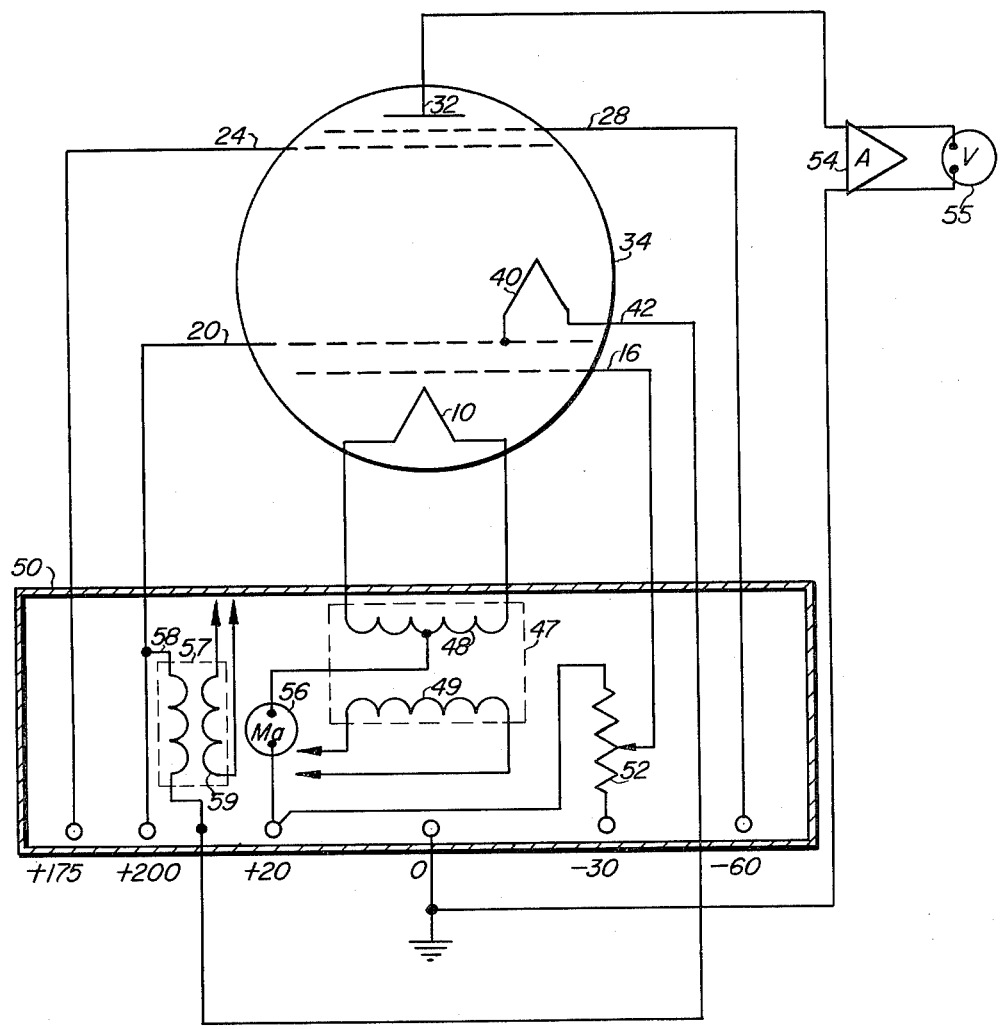

Referring to the drawings, FIGURE 1 is a diagrammatic, schematic, cross sectional view of the electronic vacuum tube apparatus of the invention. FIGURE 2 is an electrical schematic diagram of the circuitry used in one embodiment of the invention. As seen in FIG. 1, the present invention comprises an electronic device with four grids 16, 20, 24 and 28, a thermionic cathode 10, and an ion-collecting plate or surface 32. In addition to these elements still another feature easily incorporated into the system is an auxiliary filament 40 mounted in the space between grids 20 and 24 with one end connected to grid 20. This filament is used for the evaluation of vacuum by the "flash-filament" method.

In contrast to the Bayard gauge, the X-ray effect is minimized, not by reducing the area of the ion collector 32, but by incorporating within the structure a suppressor grid 28 which returns the X-ray photo-electrons to the ion collector surface and in this manner substantially completely eliminates rather than reduces the pressure equivalent of the X-ray effect background current.

Although there are many embodiments of some or all of the principal advantages of the tube structure to be described here, a preferred one involves a concentric system for the elements of the device. (See FIG. 1.) Here in the center is a filament 10 which is heated by the secondary winding of transformer 47. The control grid 16 may be adjusted in its potential with respect to the filament so that the electron emission can be varied at will from less than $10^{-6}$ ampere to $10^{-2}$ ampere depending of course on the details of the design. The first accelerating electron grid 20 marks the inside boundary of the useful ionization region. This grid is generally maintained positive with respect to the filament 150 to 200 volts. The third grid 24 is only slightly less positive than grid 20 and serves to define the outermost boundary of the principal ionization region. This grid also serves to sweep ions produced in this space toward the outside structure and finally to the ion collector 32. In operation of the gauge the suppressor grid 28 is made sufficiently negative with respect to the ion collector 32 so that photoelectrons emitted by the ion collector 32 are returned to it. The proper potential for grid 28 is easily established by adjusting the control grid 16 to such a negative value that electrons do not leave the space 14 adjacent the filament 10. Accordingly, these electrons do not produce ionization even though the filament 10 is operated at its normal high temperature. However, light from the filament 10 does fall on the collector plate 32 and produces a measurable photoelectric current if there is no voltage on the suppressor grid 28. As the suppressor 28 is made more and more negative, the photoelectric current produced at the ion collector 32 can be reduced to zero. This is the optimum condition for operation. The ion collector 32 may be either a cylindrical metallic structure or it may be a conducting coating on the insulating envelope 34, generally glass.

FIGURE 2 shows the elements described in their relation to the preferred operating circuit. The power supply 50 furnishes direct and alternating current. Suitable voltages are shown. The control grid 16 is biased by means of the potential divider 52. With the maximum bias, no electron current is indicated on the milliammeter 56 even when the filament 10 is heated to its standard operating temperature by means of voltage from secondary winding 48 of the transformer 47 comprised of windings 48 and 49. The voltages on the other grids are indicated, although the exact values shown are in no way to be considered the most favorable under all circumstances. These voltages are typical. The ionization current which indicates the arrival of ions at the collector 32 shows on the voltmeter 55 connected to the vacuum tube electrometer amplifier 54. This instrument should have a wide range of current sensitivity and, at constant pressure, the ion currents will in general be directly proportional to the electron currents measured on meter 56. The electron current can be controlled by the adjustment of the contact on potential divider 52. Electrons which enter the space between the second grid 20 and the third grid 24 may oscillate back and forth a few times before they are collected on either of these two grids. Each time an electron crosses this space there is a chance that it will collide with an atom with sufficient energy to remove one of the electrons from the atom and leave it a positive ion. The ion is then accelerated toward collector 32. The suppressor grid 28 is made with very fine wires so that a negligible fraction of the ions will be collected upon it instead of the main ion collector 32.

Even though soft X-rays are produced as the electrons are absorbed in grids 20 and 24, the photo-electrons produced at 32 by these soft X-rays cannot escape beyond grid 28 and in fact, are turned back by means of the negative potential maintained on grid 28. They do not register as a current on the vacuum tube electrometer amplifier meter 55. It is this distinct advantage in this method of operation that permits the measurement of pressures lower than that possible with the Bayard-type ionization gauge.

Still another feature may be incorporated in this ionization gauge which is known as the "flash-filament" method of measurement. Filament 40 has one terminal of the filament connected directly to the second grid 20 and the other terminal is connected to the secondary winding 58 of an insulated transformer 57 of which the primary is 59. After this filament has been cleaned by high-temperature flashing and then cooled many of the atoms that strike the filament stick to it and build up a fraction of a molecular layer in the course of a reasonable time. Thus the partial pressure of particularly objectionable gases (in contrast to helium) can be evaluated by noting the burst of ionization which takes place the instant this filament is flashed to a high temperature after it has accumulated a certain amount of gas.

For the convenience of illustration, in FIG. 1 the various grids have been equally spaced but as a practical matter, the suppressor grid 28 will actually be spaced very close to the collector 32, and there will be a relatively large space between the two electron grids 20 and 24.

Since certain changes may be made in the above apparatus without departing from the scope of the invention herein involved, it is intended that all matter contained in the above description, or shown in the accompanying drawings shall be interpreted as illustrative and not in a limiting sense.

What is claimed is:

1. An ionization gauge for measuring vacuum comprising a sealed envelope connected to a vacuum chamber through an opening for admission of gas whose pressure is to be measured, said envelope containing a thermionic cathode, four sequentially arranged grids, and a plate, the first grid operating as a control electrode and being maintained at a negative voltage with respect to the cathode by power supply means for the grids, plate and cathode, the second grid doperating as an electron collecting grid and being maintained at a positive potential, the third grid being maintained at a positive potential similar to the positive potential on the second grid and being spaced therefrom to provide a region between said second and third grids where electrons travel back and forth producing ions by bombardment of gas molecules present in that region, the fourth grid being maintained at a lower negative potential than the plate, said negative potential forcing photo-electrons back to the plate which are produced by X-rays hitting the plate thereby reducing the amount of background current, the plate being maintained at a negative potential with respect to the cathode and acting as an ion collector, the thermionic cathode being operated at so high a temperature that its electron emission is space charge limited, and power supply means for heating said cathode to said high temperature.

2. The apparatus of claim 1 wherein said grids are of fine wire helically spaced, said envelope comprising material impervious to air, said envelope, grids, filament and plate being spaced each from the other with the second and third grids spaced further apart, with lead in conductors spaced so that they will not contact and will be supported by the glass envelope at the base.

3. The apparatus of claim 1 wherein the electrodes are spaced apart and the thermionic cathode is placed in the center with the grids and the plate concentrically arranged about it.

4. The apparatus of claim 1 wherein a filament is attached to said second and means is provided for supplying current to said filament through said grid so that said filament can be periodically "flashed" to indicate the pressure within the envelope.

5. The apparatus of claim 1 wherein the third grid is maintained about 25 volts less positive than the second grid.

6. The apparatus of claim 1 wherein the sealed envelope is a portion of the vacuum chamber.

References Cited in the file of this patent

UNITED STATES PATENTS

| 2,454,564 | Nelson | Nov. 13, 1948 |
| 2,605,431 | Bayard | July 29, 1952 |
| 2,758,233 | Nelson | Aug. 7, 1956 |
| 2,870,358 | Moesta | Jan. 20, 1959 |